July 24, 1962 L. D. WILLEY, JR 3,046,099
IMPROVED POLYMER FINISHER APPARATUS
Filed May 12, 1960
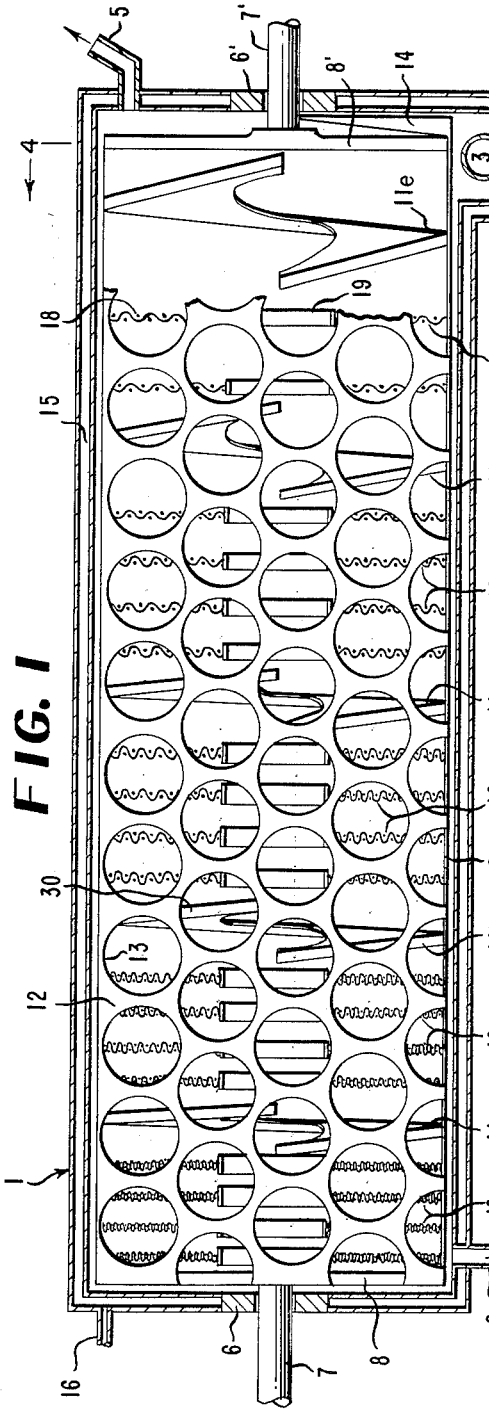
INVENTOR
LEROY DEFOREST WILLEY, JR.
BY *H. William Petry*
ATTORNEY

3,046,099
IMPROVED POLYMER FINISHER APPARATUS
Leroy Deforest Willey, Jr., Newark, Del., assignor to E. I. du Pont de Nemours and Company, Wilmington, Del., a corporation of Delaware
Filed May 12, 1960, Ser. No. 28,751
13 Claims. (Cl. 23—285)

This invention relates to an apparatus for converting a liquid of low viscosity into a liquid of high viscosity by removal of a volatile material, being particularly adapted for polycondensation reactions in which volatile material is removed and a polymeric material of high viscosity is produced which remains in the liquid state at the temperature prevailing during the reaction.

The commercial preparation of most linear condensation polymers, such as polyesters or polyamides, involves heating monomeric starting materials to cause progressive condensation with loss of a low molecular weight volatile material until the desired molecular weight level is achieved. In a typical example, polyethylene terephthalate is formed from bis-2-hydroxyethyl terephthalate by heating the starting material at increasingly higher temperatures and increasingly lower pressures with evolution of ethylene glycol until the desired fiber- or film-forming viscosity level is achieved. The process is usually carried out in two or more stages, with intermediate formation of a low molecular weight, low viscosity polymeric liquid which is then passed through a vessel in which it is maintained at a high temperature and a very low pressure. Vessels of this type are customarily known as polymer finishers.

Quality of product, as measured by uniformity of polymer viscosity and freedom of the polymer from contaminating materials, is obviously highly important. Polymer finishers in the past have been a source of polymer contaminants and viscosity non-uniformities, in that areas of stagnation exist in which polymer flows at a rate far less than the rate of the general polymer mass and collects at the entrance to vents, on the walls above the main body of the polymer, or in areas of obstruction to flow. Since such areas are normally at the same temperature as the remainder of the vessel, the polymer in the areas of stagnation becomes seriously degraded. When a sufficient amount of the degraded polymer collects, it falls into or is washed into the main body of polymer again. The effect of this degraded polymer is manifested in the yarn or other finished product as black specks, poor yarn color, or streaks exhibiting off-standard behavior toward dyes. Such streaks may frequently be seen with the unaided eye in the yarn directly after spinning, or their presence may be detected by examining the yarn under ultraviolet light, whereupon the streaks may be seen to flucresce. The degraded polymer is also manifested by poor or irregular yarn physical properties.

It is, therefore, desirable to provide uniform vapor evolution and to avoid stagnation areas in the polymerization zone. At the same time, however, a continuous reaction gradient must be maintained between the inlet and outlet end of the finishers. When this condition is interrupted, incompletely polymerized liquid may be introduced into the finished polymer, resulting in variable polymer viscosity and, consequently, non-uniform yarn physical properties, including non-uniform dye depth.

It is an object of this invention to provide an improved polymer finisher apparatus. Another object is to provide a polymer finisher capable of uniformly removing vapor, while maintaining a continuous reaction gradient and preventing the development of stagnation areas and the introduction of incompletely polymerized liquid into the product.

These and other objects are accomplished according to this invention by the novel apparatus including a cylindrical polymerization vessel having its longitudinal axis disposed in a substantially horizontal plane and having an inlet for liquid near one end, an outlet for liquid near the other end, an outlet for vapor near at least one of the ends, and an agitator mounted for rotation within the vessel.

The agitator comprises a perforated cylindrical sheath structure having an outside diameter only slightly less than the inside diameter of the cylindrical vessel and having mounted within it, along the length thereof and substantially perpendicular to its axis, a plurality of annular foraminous members. These members are placed at intervals along the length of the perforated cylindrical structure. Preferably, annular screw flight members are interspersed at intervals among the annular foraminous members. Both the foraminous and screw-flight members have an open center portion to provide a passageway for evolving volatile material to the vapor outlet or outlets. These members also preferably have substantially the same outside diameter.

FIGURE 1 shows, in longitudinal elevation, one embodiment of this invention, the polymerization vessel 1 and a portion of the agitator 9 mounted within it being shown in section. Vessel 1 has inlet 2 at the lower part of the vessel near one end to receive liquid and outlet 3 communicating with well 4 in the lower part of the vessel near the other end to discharge liquid. Vent 5, for discharging vapor, is located in the upper portion of the vessel at the discharge end. If desired, a vent may be provided at each end. Journals 6 and 6′, at opposite ends of the vessel, rotatably mount shafts 7 and 7′ extending axially from spoked or otherwise perforated end wheels 8 and 8′ of agitator 9. The shafts are rotated by suitable means outside the vessel, not shown.

The agitator, shown partly in elevation and partly in section, includes mutually parallel annular screens 10a, 10b, 10c, 10d, and 10e (all in section) of increasing mesh size and spaced at increasing distances progressing from the inlet end to the outlet end of the vessel, interspersed with annular screw flights 11a, 11b, 11c, 11d, and 11e (all in elevation) of increasing pitch or "bite" progressing from the inlet end to the outlet end of the vessel. The screens and screw flights are mounted within and are supported by a cylindrical sheath 12 extending between and mounted upon the end wheels. The sheath is perforated throughout its area by holes 13. Trapezoidal blade 14 affixed to shaft 7′ at the outlet end of the vessel has a height equal to the radius of the cylindrical sheath. Vessel 1 is surrounded by jacket 15 provided with suitable inlet and outlet vents 16 and 17 for circulation of fluid means for maintaining the desired temperature. Heat is usually supplied to the vessel, although in some instances removal of heat may be necessary. If desired, the agitator may be strengthened by adding suitable reinforcing members, such as tie rods (not shown), but one advantage of this novel apparatus is to preclude the necessity for such members while still providing the desired strength characteristics as provided by the cylindrical sheath.

FIGURE 2 illustrates a transverse elevation of annular screen 10c, which comprises an annular area of wire screen or mesh 18 to which is affixed circular inner and outer rims 19 and 20, respectively. The outer rim is mounted within cylindrical sheath 12, seen in section in FIGURE 2. Screens 10a, 10b, 10d, and 10e are similar to annular screen 10c, except that screens or wire mesh of different porosity are used, 10a having the finest mesh and 10e the coarsest. The spacing between the screens is also preferably increased in progressing from the inlet end to the outlet end of the vessel.

Instead of five variations in mesh size of the screens as shown in the drawing, there may, of course, be a greater or lesser number of mesh sizes; however, it is preferred that more than one size be used. If desired, perforated annular plates or other annular foraminous members may be substituted for the annular screens. A perforated plate, of course, is one having a multiplicity of perforations, sufficient to permit the desired flow rate of polymer through the vessel.

FIGURE 3 illustrates a transverse elevation of annular screw flight 11c mounted within cylindrical sheath 12, seen in section in FIGURE 2. Screw flights 11a, 11b, and 11d have the same transverse appearance as screw flight 11c, the difference in the flights being in their pitch or "bite." The pitch is least for flight 11a and greatest for flight 11d. In general, flights having an arc of 360° are quite satisfactory. The minimum arc is 180°, and in this case, it is preferred that the leading edges 22 of alternate screw flights be mounted at an angle of 180° with respect to each other to improve compartmentation in the agitator. Although there is no practicable critical maximum arc, screw flights having an arc more than 540° are usually not employed. Generally, about one annular screw flight is used for each four annular foraminous members.

FIGURE 4 is a transverse sectional elevation of the vessel and agitator mounted within it taken at line 4—4 in FIGURE 1, near the end of the vessel through perforated end wheel 8'. In the embodiment shown in FIGURE 4, the perforations comprise scallops 21 around the periphery of the wheel; however, the perforations may be circular holes or the wheel may comprise a plurality of spokes emanating from a hub to a rim. Cylindrical sheath 12 is mounted upon the end wheels and the rotational motion of the agitator is imparted through shafts 7 and 7'. FIGURE 4 also shows well 4 in the lower part of the vessel, from which finished polymer is drawn off through outlet 3. Removal of the product may be facilitated by use of an exhaust pump (not shown) in the outlet line.

In another embodiment of the apparatus of the invention, the agitator contains annular screens only, the annular screw flights being omitted. In the absence of screw flights, forwarding of the polymer between the inlet and the outlet is achieved by tilting the axis of the vessel slightly downward in the direction of the outlet, or by maintaining a sufficient level of polymer at the inlet end, with respect to the outlet end. The level would be adjusted close to, but not within, the passage defined by the open central areas of the annular screens. However, the presence of screw flights in the agitator is helpful in preventing part of the polymerizing mass from by-passing other portions of the liquid under treatment, and in general, it is preferred to include screw flights in the agitator, as in the embodiment shown in FIGURE 1.

The perforations in the cylindrical sheath may be diamond-shaped rather than circular. Perforations of other shapes may also be employed, of course. In general, the open or free area in the sheath should be in the range of about 65 to about 80% of the entire surface area of the sheath.

Operation of the finisher is readily understood. Liquid of relatively low viscosity is forced by suitable means into the inlet of the vessel and passed to the other end and out the outlet, the flow being effected either through gravity alone or with the aid of screw flights through rotation of the agitator, as in the apparatus embodiment of FIGURE 1.

As the agitator turns, a film of the hot liquid is carried up and transversely around the vessel by the annular screens. As the film is carried above the level of the main body of the liquid, its large surface area facilitates rapid evaporation of volatile components. The vapor flows through the passage defined by the open central areas of the annular screens and screw flights, through or around the scallops or other open areas in the end wheel, and out of the vessel through vent 5, which is usually maintained at very low pressure by employing suitable vacuum producing means (not shown). If desired, a vent may also be provided at the inlet end of the finisher. The open central areas of the annular screens and screw flights have a diameter sufficient to preclude filming over of the area by liquid flowing from above. In general, the diameter of the central area is in the range of about 15 to about 40% of the outside diameter of the annular member.

Continual interchange of the liquid between the film maintained on the foraminous members and the main body of the liquid occurs as the polymer flows through the vessel. However, the screens afford sufficient resistance to flow of the liquid to produce a continuous reaction gradient from the inlet end to the outlet end of the finisher. Maintenance of the reaction gradient is facilitated by the presence of screw flights after each set of several screens and this form of the apparatus represents the preferred embodiment of the invention.

In accordance with the invention, the cylindrical sheath performs an important function in eliminating areas of stagnation in which degradation of polymeric liquid may occur. The sheath rotates within the cylindrical vessel with a relatively close clearance all around. In effect, the rotating sheath operates to wipe the entire inner wall of the vessel constantly, precluding stagnation of the polymeric liquid at any point in the line of flow. Desirably, openings along the upper portion of the cylindrical wall of the vessel are avoided to eliminate dead areas and permit most effective use of the wiping action of the sheath. For this reason, it is preferred to locate vents and other necessary openings at the end walls of the vessel.

The use of a perforated cylindrical structure is highly advantageous because of its smooth and uniform action in wiping the walls of the vessel while constraining the polymeric liquid on the upper walls as a film, as contrasted with agitators having only a few bars or rods at the periphery, which tend to push waves of the liquid up on the wall and then release them at the upper portion of the wall with consequent flooding of the foraminous members. Surprisingly, the cylindrical structure not only operates to prevent such flooding, but also maintains the liquid in transverse rotation without disturbing the continuous reaction gradient in the vessel. Furthermore, the cylindrical structure provides excellent strength characteristics without causing stagnant areas.

In the apparatus embodiment shown in the figures, end wheel 8 serves to wipe the inlet end of the vessel in a manner similar to the wiping of the cylindrical wall by the sheath. At the outlet end, end wheel 8' is spaced away from the vessel wall to facilitate passage of vapors into the vent, while blade 14 serves to wipe the wall. If desired, the blade may be omitted and the outlet wall may also be wiped by the end wheel; in such a case, the perforations in the end wheel and the outlet vent are suitably shaped and spaced so that a continuous open passage for vapor removal exists as the agitator rotates. Of course, if a vent is provided at each end of the vessel, the apparatus will be adapted at each end for vapor removal and wiping action.

In practice, the dimensions of the vessel and the agitator, the porosity of the annular foraminous members, the pitch of the screw flights, and the agitator speed will depend upon the liquid being processed. The following general ranges of size, etc. have been found desirable for a finisher utilized for the polycondensation of polyethylene terephthalate having a low degree of polymerization and an absolute viscosity of 3 to 10 poises at 275° C. to produce highly polymeric polyethylene terephthalate having an absolute viscosity of 1200 to 4000 poises at 275° C. In general, the porosity ranges from about 4 openings per linear inch for the finest mesh screen to about 0.5 opening per inch for the coarsest mesh screen. The pitch of the screw flights usually ranges from about ¾ inch at the inlet end to about 3 inches at the outlet end. The clearance between the sheath and the cylindrical vessel is preferably in the range of about 1/16 to 3/8 inch, while the perforations in the sheath desirably have diameters in the range of about 4 to 15 inches, depending upon the agitator size. In the case of non-circular perforations, the latter range applies to the diameter of the largest circle which may be inscribed in the perforations. The agitator is preferably operated at a rate of about one to three complete turns per minute.

*Example*

There is provided a cylindrical polymerization vessel about 66 inches long and 12.5 inches in diameter having an inlet near one end, an outlet near the other end (64 inches from the inlet), and a vent for removing vapor at the inlet end. An agitator similar to that shown in FIGURE 1 is mounted for rotation in the vessel, the clearance between the cylindrical sheath and the vessel being 3/16 inch all around. The agitator comprises the following elements. In each case the distance given from the inlet end of the agitator refers to the beginning of the element or series of elements.

| Distance from Inlet End of Agitator | Element or Elements |
|---|---|
| 0 | End wheel at inlet end. |
| 2¾″ | Four 4 x 4 mesh screens, spaced ¾″ apart. |
| 5¾″ | Screw Flight having 13/16″ pitch. |
| 8⅛″ | Four 4 x 4 mesh screens, spaced 1″ apart. |
| 12⅛″ | Screw Flight having 13/16″ pitch. |
| 14⅝″ | Four 2 x 2 mesh screens, spaced 1⅛″ apart. |
| 19⅛″ | Screw Flight having 13/16″ pitch. |
| 21¾″ | Four 2 x 2 mesh screens, spaced 1¼″ apart. |
| 26¾″ | Screw Flight having 1¾″ pitch. |
| 30 7/16″ | Four ¾ x ¾ mesh screens, spaced 1½″ apart. |
| 36 13/16″ | Screw Flight having 2″ pitch. |
| 41⅜″ | Two ¾ x ¾ mesh screens, spaced 2⅜″ apart. |
| 46⅛″ | Screw Flight having 25/16″ pitch. |
| 52⅛″ | Two ¾ x ¾ mesh screens, spaced 3½″ apart. |
| 59⅛″ | Screw Flight having 25/16″ pitch. |
| 63¾″ | End wheel at outlet end. |

The clearance between the end wheels at the outlet and inlet ends and the corresponding end walls of the vessel is 1/16 inch. No scraper blade is used.

A condensate of low viscosity is prepared by heating 100 parts by weight of dimethyl terephthalate with 72 parts of ethylene glycol in the presence of a catalyst comprising 0.045 part of manganous acetate and 0.048 part of antimony trioxide, methanol being removed until no more is evolved. The temperature is then increased to 275° C., the pressure reduced to about 25 mm. of mercury, and glycol distilled over until the remaining liquid has a relative viscosity of 5.5.

The interior of the vessel is evacuated to a pressure of 2.5 mm. of mercury by evacuation through the vent and the agitator is rotated at a constant speed of 2.6 r.p.m. The low viscosity starting material liquid is introduced at a constant rate into the inlet of the horizontal vessel to provide a steady state of liquid passage through the vessel and out the outlet without the liquid level rising at any time into the central open passage defined by the annular members. At a prevailing temperature of 275° C., the holdup time is 2 hours, and the throughput rate 30 lbs./hr. The liquid enters with an absolute viscosity of 6 poises and a relative viscosity of 5.5 and leaves with its viscosity increased to about 2500 poises and relative viscosity increased to 25.5. The resulting polymer is characterized by excellent white color and is markedly uniform in quality throughout a protracted run, as indicated by a substantially constant viscosity.

The apparatus is also readily adaptable to the processing of other linear condensation polymers, such as to the preparation of polyhexamethylene adipamide from a low molecular weight condensate of hexamethylene diamine and adipic acid. The invention can also be employed in the evaporation of dilute solutions of viscous liquids to remove part or all of the solvent from the dissolved liquid, being especially useful in the processing of such liquids which are prone to degradation when heated for prolonged periods of time.

I claim:

1. An improved polymer finishing apparatus comprising a cylindrical vessel; an inlet for liquid near one end of said vessel; an outlet for liquid near the other end; an outlet for vapor near at least one end; a peripherally perforated cylindrical structure mounted for rotation within said vessel, the diameter of said cylindrical structure being only slightly less than the inside diameter of the vessel; and a plurality of annular foraminous members mounted within said structure along its length and substantially perpendicular to the axis thereof, each of said members provided with a plurality of small evenly distributed passageways extending therethrough.

2. The apparatus of claim 1 wherein the outlet for vapor is at the same end as the inlet for liquid.

3. Improved apparatus comprising a cylindrical vessel; an inlet for liquid near one end of said vessel; an outlet for liquid near the other end; an outlet for vapor near at least one end; a peripherally perforated cylindrical structure mounted for rotation within said vessel, the diameter of said cylindrical structure being only slightly less than the inside diameter of the vessel; a plurality of annular foraminous members mounted within said structure along its length and substantially perpendicular to the axis thereof; and a plurality of annular screw flight members mounted within said structure along its length and substantially perpendicular to the axis thereof, said screw flights being located between groups of said foraminous members.

4. The apparatus of claim 3 wherein the foraminous members and screw flight members each have an open center portion.

5. The apparatus of claim 4 wherein the diameter of the open center portion of each of the foraminous members and screw flight members is between about 15% and about 40% of the diameter of the foraminous member and screw flight member.

6. The apparatus of claim 5 wherein perforated areas in the cylindrical structure comprise between about 65% and about 80% of the entire outer surface area of said structure.

7. The apparatus of claim 6 wherein the porosity of the foraminous members and the space between them gradually increases from the inlet end to the outlet end of the vessel.

8. The apparatus of claim 7 wherein the pitch of the screw-flight members gradually increases from the inlet end to the outlet end of the vessel.

9. The apparatus of claim 7 wherein the porosity increases gradually from about 4 openings per linear inch for the foraminous members at the inlet end of the vessel to about 0.5 opening per linear inch for the foraminous members at the outlet end.

10. The apparatus of claim 9 wherein the pitch increases gradually from about ¾ inch at the inlet end of the vessel to about 3 inches at the outlet end.

11. The apparatus of claim 10 wherein the clearance between the cylindrical structure and the inside of the vessel is about 1/16 and about 3/8 of an inch.

12. The apparatus of claim 11 wherein the leading edges of each of the screw flights are oriented at an angle of about 180° with respect to the next adjacent screw flight and the vessel has its horizontal axis disposed in a substantially horizontal plane.

13. An improved polymer finishing apparatus comprising a cylindrical vessel, said vessel comprising an inlet for liquid, an outlet for liquid, and an outlet for vapor, a peripherally perforated cylindrical structure mounted for rotation within said vessel, the diameter of said cylindrical structure being only slightly less than the inside diameter of the vessel; and a plurality of foraminous members mounted within said structure along its length and substantially perpendicular to the axis thereof, each of said foraminous members provided with an enlarged central opening to permit substantially free axial movement of vapor in said vessel.

References Cited in the file of this patent
UNITED STATES PATENTS

| | | |
|---|---|---|
| 804,677 | Sahlin | Nov. 14, 1905 |
| 2,560,391 | Kleinert | July 10, 1951 |
| 2,923,604 | Fawley et al. | Feb. 2, 1960 |